United States Patent
Guan et al.

(10) Patent No.: US 9,133,313 B2
(45) Date of Patent: Sep. 15, 2015

(54) OLEFIN METATHESIS FOR EFFECTIVE POLYMER HEALING VIA DYNAMIC EXCHANGE OF STRONG CARBON-CARBON BONDS

(71) Applicant: The Regents of the University of California, Oakland, CA (US)

(72) Inventors: Zhibin Guan, Irvine, CA (US); Yixuan Lu, Irvine, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 13/962,380

(22) Filed: Aug. 8, 2013

(65) Prior Publication Data
US 2014/0045997 A1   Feb. 13, 2014

Related U.S. Application Data (60) Provisional application No. 61/680,982, filed on Aug. 8, 2012.

(51) Int. Cl.
*C08J 3/24* (2006.01)
*C08K 5/56* (2006.01)

(52) U.S. Cl.
CPC .. *C08J 3/24* (2013.01); *C08J 3/246* (2013.01); *C08K 5/56* (2013.01); *C08J 2309/00* (2013.01)

(58) Field of Classification Search
CPC ................ C08J 3/24; C08J 3/246; C08K 5/56
USPC .................................. 525/196, 333, 360, 370
See application file for complete search history.

(56) References Cited

U.S. PATENT DOCUMENTS

2003/0013551 A1*   1/2003 Harris et al. .................. 473/367

OTHER PUBLICATIONS

Yao, L.; Yuan, Y. C.; Rong, M. Z.; Zhang, M. Q. Polymer 2011, 52, 3137-3145.
Yoon, J. A.; Kamada, J.; Koynov, K.; Mohin, J.; Nicolaÿ, R.; Zhang, Y.; Balazs, A. C.; Kowalewski, T.; Matyjaszewski, K. Macromolecules 2011, 45, 142-149.
Deng, G.; Tang, C.; Li, F.; Jiang, H.; Chen, Y. Macromolecules 2010, 43, 1191-1194.
Skene, W. G.; Lehn, J.-M. P. Proc. Natl. Acad. Sci. U. S. A. 2004, 101, 8270-8275.
Zheng, P.; McCarthy, T. J. J. Am. Chem. Soc. 2012, 134, 2024-2027.
Ghosh, B.; Urban, M. W. Science 2009, 323, 1458-1460.
Wang, H. P.; Yuan, Y. C.; Rong, M. Z.; Zhang, M. Q. Macromolecules 2009, 43, 595-598.
Rowan, S. J.; Cantrill, S. J.; Cousins, G. R. L.; Sanders, J. K. M.; Stoddart, J. F. Angew. Chem., Int. Ed. 2002, 41, 898-952.
Maeda, T.; Otsuka, H.; Takahara, A. Prog. Polym. Sci. 2009, 34, 581-604.
Ling, J.; Rang, M. Z.; Zhang, M. Q. Polymer 2012, 53, 2691-2698.
Montarnal, D.; Capelot, M.; Tournilhac, F.; Leibler, L. Science 2011, 334, 965-968.
Scott, T. F.; Schneider, A. D.; Cook, W. D.; Bowman, C. N. Science 2005, 308, 1615-1617.
Schrock, R. R. J. Mol. Catal A: Chem 2004, 213, 21-30.
Vougioukalakis, G. C.; Grubbs, R. H. Chem. Rev. 2009, 110, 1746-1787.
Lu, Y.-X.; Tournilhac, F.; Leibler, L., Guan, Z. J. Am. Chem. Soc. 2012, 134, 8424-8427.
Ferry, J. Viscoelastic Properties of Polymers; Wiley: New York, 1980.
Sanford, M. S.; Love, J. A.; Grubbs, R. H. J. Am. Chem. Soc. 2001, 123, 6543-6554.
Maynard, H. D.; Okada, S. Y.; Grubbs, R. H. Macromolecules 2000, 33. 6239-6248.
Kim, Y. H.; Wool, R. P. Macromolecules 1983, 16, 1115-1120.
White, S. R.; Sottos, N. R.; Geubelle, P. H.; Moore, J. S.; Kessler. M. R.; Sriram, S. R.; Brown, E. N.; Viswanathan, S. Nature 2001, 409, 794-797.
Toohey, K. S.; Sottos, N. R.; Lewis, J. A.; Moore, J. S.; White, S. R. Nat. Mater. 2007, 6, 581-585.
Cordier, P.; Tournilhac, F.; Soulie-Ziakovic, C.; Leibler, L. Nature 2008, 451, 977-980.
Montarnal, D.; Tournilhac, F.; Hidalgo. M.; Couturier. J.-L.: Leibler, L. J. Am. Chem. Soc. 2009, 131, 7966-7967.
Burattini, S.; Greenland, B. W.; Merino, D. H.; Weng, W.; Seppala, J.; Colquhoun, H. M.; Hayes, W.; Mackay, M. E.; Hamley, I. W.; Rowan, S. J. J. Am. Chem. Soc. 2010, 132, 12051-12058.

(Continued)

*Primary Examiner* — Nathan M Nutter
(74) *Attorney, Agent, or Firm* — Mintz Levin Cohn Ferris Glovsky and Popeo, P.C.; Shovon Ashraf

(57) ABSTRACT

A method of preparing a malleable and/or self-healing polymeric or composite material is provided. The method includes providing a polymeric or composite material comprising at least one alkene-containing polymer, combining the polymer with at least one homogeneous or heterogeneous transition metal olefin metathesis catalyst to form a polymeric or composite material, and performing an olefin metathesis reaction on the polymer so as to form reversible carbon-carbon double bonds in the polymer. Also provided is a method of healing a fractured surface of a polymeric material. The method includes bringing a fractured surface of a first polymeric material into contact with a second polymeric material, and performing an olefin metathesis reaction in the presence of a transition metal olefin metathesis catalyst such that the first polymeric material forms reversible carbon-carbon double bonds with the second polymeric material. Compositions comprising malleable and/or self-healing polymeric or composite material are also provided.

20 Claims, 7 Drawing Sheets

(56) References Cited

OTHER PUBLICATIONS

Burattini, S.; Colquhoun, H. M.; Fox, J. D.; Friedmann, D.; Greenland, B. W.; Harris, P. J. F.; Hayes, W.; Mackay, M. E.; Rowan, S. J. Chem. Commun. 2009, 6717-6719.

Holten-Andersen, N.; Harrington, M, J.; Birkedal, H.; Lee. B. P.; Messer-smith, P. B.; Lee, K. Y. C.; Waite, J. H. Proc. Natl. Acad. Sci. U. S. A. 2011, 108, 2651-2655.

Phadke, A.; Zhang, C.; Arman, B.; Hsu. C.-C.; Mashelkar, R. A.; Lele, A. K.; Tauber, M. J.; Arya, G.; Varghese, S. Proc. Natl. Acad. Sci. U. S. A. 2012, 109, 4383-4388.

Burnworth, M.; Tang, L.; Kumpfer, J. R.; Duncan, A. J.; Beyer, F. L.; Fiore, G. L.; Rowan, S. J.; Weder, C. Nature 2011, 472, 334-337.

Chen, Y.; Kushner, A. M.; Williams, G. A.; Guan. Z. Nat. Chem. 2012, 4, 467-472.

Wang, Q.; Mynar, J. L.; Yoshida, M.; Lee, E.; Lee, M.; Okuro, K.; Kinbara, K.; Aida, T. Nature 2010, 463, 339-343.

Harada, A.; Kobayashi, R.; Takashima, Y.; Hashidzume, A.; Yamaguchi, H. Nat. Chem. 2011, 3, 34-37.

Chen, X.; Dam, M. A.; Ono, K.; Mal, A.; Shen, H.; Nutt, S. R.; Sheran, K.; Wudl, F. Science 2002, 295, 1698-1702.

Murphy, E. B.; Bolanos, E.; Schaffner-Hamann, C.; Wudl, F.; Nutt, S. R.; Auad, M. L. Macromolecules 2008, 41, 5203-5209.

Reutenauer, P.; Buhler, E.; Boul, P. J.; Candau, S. J.; Lehn, J. M. Chem—Eur. J. 2009, 15, 1893-1900.

Chung, C.-M.; Roh, Y.-S.; Cho, S.-Y.; Kim, J.-G. Chem. Mater. 2004, 16, 3982-3984.

Froimowicz, P.; Frey, H.; Landfester, K. Macromol. Rapid Commun. 2011, 32, 468-473.

Capelot, M.; Montarnal, D.; Tournilhac, F.; Leibler, L. J. Am. Chem. Soc. 2012, 134, 7664-7667.

Amamoto, Y.; Kamada, J.; Otsuka, H.; Takahara, A.; Matyjaszewski, K. Angew. Chem., Int. Ed. 2011, 50, 1660-1663.

Imato, K.; Nishihara, M.; Kanehara, T.; Amamoto, Y.; Takahara, A.; Otsuka, H. Angew. Chem., Int. Ed. 2012, 51, 1138-1142.

* cited by examiner

OLEFIN METATHESIS FOR EFFECTIVE POLYMER HEALING VIA DYNAMIC EXCHANGE OF STRONG CARBON-CARBON BONDS

STATEMENT REGARDING FEDERALLY SPONSORED RESEARCH OR DEVELOPMENT

This invention was made with Government support under Grant No. DE-FG02-04ER46162, awarded by the Department of Energy. The U.S. Government has certain rights in this invention.

BACKGROUND

1. Field of the Invention

The invention relates to polymeric materials that undergo transition-metal catalyzed olefin metathesis reactions.

2. Related Art

Introducing self-healing capability into materials would greatly improve their safety feature, lifetime, and energy efficiency. A significant amount of efforts has been devoted to this field in recent years and several groups have reported different self-healing polymer designs through the incorporation of encapsulated monomers (1,2) dynamic non-covalent bonding, (3-12) and reversible (13-25) or irreversible (26,27) covalent bonds into polymers. Recently, dynamic covalent chemistry (28,29)—such as thermal (13-15) and light-catalyzed cycloaddition, (16,17,30) transesterification, (18,31) radical reactions, (19-21,32) thiol-disulfide exchange, (22) hydrazone formation (23,24) and siloxane equilibration (25)—have attracted much attention for their applications in self-healing or malleable polymer designs.

Most dynamic covalent bonds used for self-healing applications involve heteroatoms in dynamic exchange reactions. (18,19,22,23,25) In principle, reversible carbon-carbon (C—C) bond formation should be particularly attractive for such applications because the high stability of C—C bonds may offer the possibility of designing stronger self-healing materials. Among the few examples of dynamic C—C bond-based self-healing polymers, those involving strong C—C bonds, such as reversible Diels-Alder reactions (13) and photochemical cycloaddition reactions, (16,17,30) require substantial inputs of external energy in the form of heat or light to trigger the reversible C—C bond formation. On the other hand, the one using weak dynamic C—C bond, while can self-heal without providing external energy, only results in relatively weak self-healing polymer gels. (20) In addition, most of those self-healing systems require specially designed monomers or polymers to serve the purpose. It would be highly desirable to develop a simple strategy for effective polymer healing through dynamic exchange of strong C═C bond under ambient conditions.

SUMMARY

Figure 1:
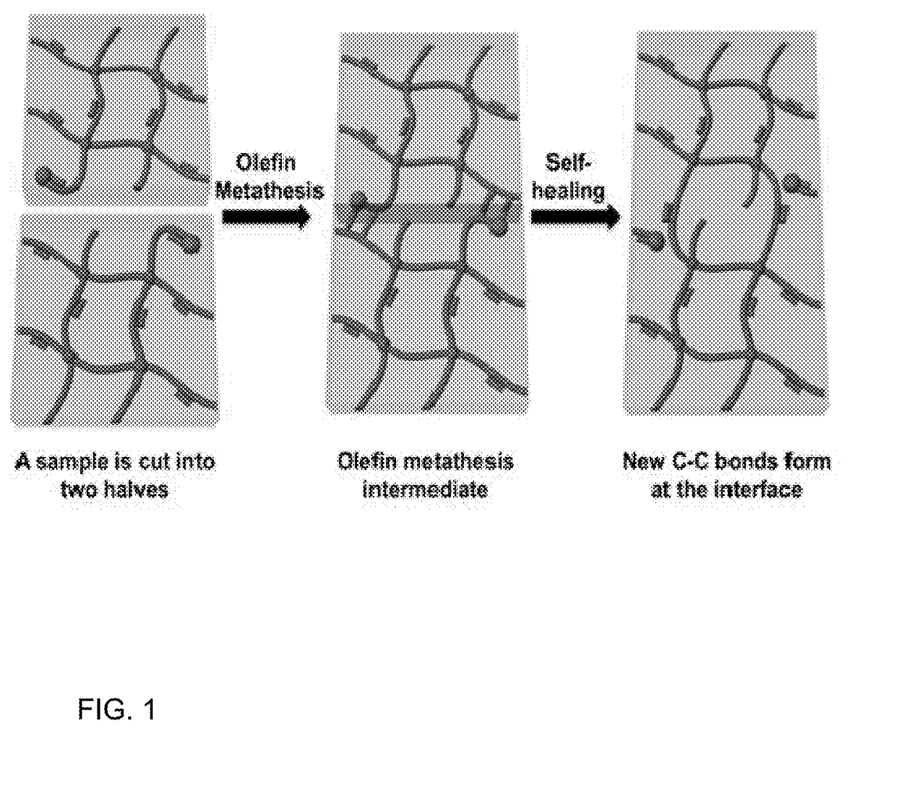
FIG. 1 is a schematic of one embodiment of Olefin Metathesis for Effective Polymer Healing via Dynamic Exchange of Strong Carbon-Carbon Double Bonds, where Ru-catalyzed olefin metathesis at fracture interfaces results in formation of new C—C double bonds between the two surfaces, affording covalent healing of the fractured polymer.

A simple, efficient self-healing polymer design employing transition-metal catalyzed olefin metathesis for reversible C—C double bond exchange is provided Scheme 1—see FIG. 1). An olefin metathesis reaction is attractive for this purpose because it is highly efficient for shuffling strong C—C double bonds under ambient conditions. (33,34) In some embodiments, by introducing a very low level of the Grubb's second-generation Ru metathesis catalyst into a readily available polybutadiene (PBD) network, the material can heal efficiently under mild conditions. With moderate pressure, this material can effectively heal in the air, at ambient or even sub-ambient temperature. Given the efficiency and versatility of olefin metathesis as well as the abundance of olefin-containing polymers, the method provides a powerful approach for self-healing material design.

In some embodiments, a method for producing self-healing materials is provided comprising performing an olefin metathesis reaction on a polymer, wherein the reaction results in dynamic C—C double bond formation within the polymer. In some embodiments, the reaction is performed using a Grubbs' catalyst. In yet another embodiment, the catalyst is applied only to the fracture surfaces of the polymer. In another embodiment, the reaction is performed using a second generation a Grubbs' catalyst; and in a more particular embodiment, the catalyst is Grubbs' ruthenium metathesis catalyst. In another embodiment, the healing of the materials can be achieved under various concentrations of the Ru catalyst, different compression pressure and temperature.

In some embodiments, a bulk polymer can be healed via dynamic covalent bond formation at sub-ambient temperature. The Ru-loaded PBD samples not only heal well with themselves but also with control samples without any catalyst. In some embodiments, a method for producing self-healing materials is provided comprising performing an olefin metathesis reaction on a polymer, wherein the reaction results in reversible C—C double bond exchange within the polymer, wherein the polymer is an olefin-containing polymer or wherein the polymer comprises a cross-linked polymer network. In some embodiments of the method the polymer is selected from a group consisting of polybutadiene. polyisoprene, butyl rubber, and polynorbornene. In yet another embodiment, a polymer produced by an olefin metathesis reaction on a polymer is provided In one aspect, a method of preparing a malleable and/or self-healing polymeric or composite material is provided. The method includes providing a polymeric or composite material comprising at least one alkene-containing polymer, combining the polymer with at least one homogeneous or heterogeneous transition metal olefin metathesis catalyst to form a polymeric or composite material, and performing an olefin metathesis reaction on the polymer so as to form reversible carbon-carbon double bonds in the polymer. More than one homogeneous or heterogeneous transition metal olefin metathesis catalyst can be combined in the method. Each catalyst can be any homogeneous or heterogeneous olefin metathesis catalyst, including but not limited to, ruthenium-based olefin metathesis catalysts (including the first and second generation of Grubbs' catalysts, the first and second generation of Hoveyda-Grubbs catalysts, and various modifications of the above-mentioned ruthenium-containing olefin metathesis catalysts), any molybdenum- or tungsten-based olefin metathesis catalyst (commonly referred to as the Shrock's catalysts), various heterogeneous olefin metathesis catalysts, and combinations thereof.

In the method, the polymeric or composite material can comprise one or more alkene-containing polymers. Any such polymer can be polybutadiene, polyisoprene, butyl rubber, polynorbornene, polycyclooctene, polycyclooctadiene, unsaturated polyesters, polystyrene-b-polybutadiene, polystyrene-b-polybutadiene-b-polystyrene, various random/block/graft copolymers containing various levels of alkene functionality on either polymer backbones or side chains, as well as various modifications (such as partial hydrogenation or functionalization) of the above-mentioned polymers. A composite material can have at least one of the above-mentioned alkene-containing polymers as the polymer matrix. Composites can be formed by either physical blending or chemical bonding of organic, inorganic, semiconducting or metallic particles in various geometry and sizes with at least one of the above-mentioned alkene-containing polymers as matrix material. Polymeric and composite materials prepared by the method are provided.

In another aspect, a method of healing a fractured surface of a polymeric material is provided. The method includes bringing a fractured surface of a first polymeric material into contact with a second polymeric material, and performing an olefin metathesis reaction in the presence of a transition metal olefin metathesis catalyst such that an olefin-containing polymer of the first polymeric material forms reversible carbon-carbon double bonds with an olefin-containing polymer of the second polymeric material. In the method, the catalyst can be provided by the first polymeric material, the second polymeric material, or both, and the catalyst can be mixed into or provided on the surface of the first polymeric material, the second polymeric material, or both. More than one homogeneous or heterogeneous transition metal olefin metathesis catalyst can be used in the method. The olefin metathesis reaction can be performed at ambient or sub-ambient temperature.

In the method, the first polymeric material and the second polymeric material can be the same or different, and when different, the polymer of the first polymeric material and the polymer of the second polymeric material can the same or different. A polymeric material can also be a composite material having at least one of the above-mentioned alkene-containing polymers as the polymer matrix. In some cases, a fractured surface of the second polymeric material is bought into contact with the fractured surface of the first polymeric material. The first polymeric material and the second polymeric material can each comprise one or more olefin-containing (or alkene-containing) polymers.

In a further aspect, a self-healing polymer composition is provided. The composition includes an olefin-containing polymer and at least one homogeneous or heterogeneous transition metal olefin metathesis catalyst, where the polymer comprises reversible carbon-carbon double bonds formed by action of the catalyst. The polymer composition has the property that it forms, by action of the catalyst, reversible carbon-carbon double bonds between two fractured surfaces of the polymer composition when the fractured surfaces are bought into contact with each other. The reversible carbon-carbon double bonds between the two fractured surfaces can occur at ambient or sub-ambient temperature. The composition can comprise one or more olefin-containing (or alkene-containing) polymers.

In another aspect, a method of forming a self-healing polymer is provided. The method includes performing an olefin metathesis reaction on an olefin-containing polymer by forming a polymer composition comprising the polymer and at least one homogenous or heterogeneous transition metal olefin metathesis catalyst, where the reaction results in reversible carbon-carbon double bond formation within the polymer. The polymer composition has the property that it forms, at ambient or sub-ambient temperature by action of the catalyst, reversible carbon-carbon double bonds between two fractured surfaces of the polymer composition when the fractured surfaces are bought into contact with each other. The polymer composition can comprise one or more olefin-containing (or alkene-containing) polymers.

BRIEF DESCRIPTION OF THE DRAWINGS

For a more complete understanding of the present invention, reference is now made to the following descriptions taken in conjunction with the accompanying drawing, in which.

DETAILED DESCRIPTION

Provisional Patent Application No. 61/680,982, filed on Aug. 8, 2012, is incorporated by reference herein.

In the methods and compositions provided, one or more homogeneous or heterogeneous transition metal olefin metathesis catalysts can be used. Each catalyst can be any homogeneous or heterogeneous olefin metathesis catalyst, including but not limited to, a ruthenium-based olefin metathesis catalyst (including the first and second generation of Grubbs' catalysts, the first and second generation of Hoveyda-Grubbs catalysts, and various modifications of the above-mentioned ruthenium-containing olefin metathesis catalysts, such as the substitution of one or more ligands in these catalysts with other type of ligands), any molybdenum- or tungsten-based olefin metathesis catalyst (commonly referred to as the Shrock's catalysts), various hetereogeneous olefin metathesis catalysts (such as $WO_3/SiO_2$ or $Re_2O_7/SiO_2$), and combinations thereof.

A polymeric material, composite material, or polymeric composition of the methods and compositions can comprise one or more olefin-containing polymers. Any olefin-containing polymer can comprise an olefin-containing main chain. In some embodiments, any polymer can be polybutadiene, polyisoprene, butyl rubber, polynorbornene, polycyclooctene, polycyclooctadiene, unsaturated polyesters, polystyrene-b-polybutadiene, polystyrene-b-polybutadiene-b-polystyrene, various random/block/graft copolymers containing various levels of alkene functionality on either polymer backbones or side chains, as well as various modifications (such as partial hydrogenation or functionalization, for example, by hydrosilation, alkene addition, or Diels-Alder reaction) of the above-mentioned polymers, and combinations thereof. In some embodiments, the polymeric material can be a composite material having at least one of the above-mentioned alkene-containing polymers as the polymer matrix. Composites can be formed by either physical blending or chemical bonding of organic, inorganic, semiconducting or metallic particles in various geometry and sizes with at least one of the above-mentioned alkene-containing polymers as matrix material. Any polymer of the polymeric material or composite can comprise a polymer network.

In the methods and compositions, healing can be considered to occur when the ultimate tensile strength of joined polymeric materials is ≥30% of a control undamaged polymeric material.

The inventor has reported the use of olefin metathesis for generating adaptive, malleable polymer networks. (35) Introduction of low levels of the Grubbs' second-generation Ru metathesis catalyst into cross-linked PBD network makes it malleable at room temperature while retaining its insolubility. The malleability arises from Ru-catalyzed olefin metathesis reaction, which covalently shuffles C—C double bonds in bulk network and rearranges network topology in response to external force. The inventor reasoned that the same mechanism can be employed to reversibly form C—C double bonds at fracture interfaces, which should result in strong covalent self-healing without the need of heat or light.

To show that such a mechanism occurs, into a cross-linked PBD network (cross-linking density ~$3.6 \times 10^{-4}$ mol/cm$^3$) was loaded a second-generation Grubbs' Ru metathesis catalyst at 0.0050, 0.0075, and 0.010 mol % (relative to the molarity of olefin), respectively. For self-healing tests, a sample was first cut with a razor blade into two separate parts and the cut faces were pressed together. Then the sample was let to heal in a Teflon mold under different conditions. Under moderate compressions (10-30 kPa), two completely cut samples could heal effectively at room temperature or even under cooling conditions. In the following examples, detailed self-healing studies of this system under various conditions (different catalyst loading, compression pressure, temperature, etc) are described.

Example 1

Effects of Ru Catalyst Loading on Healing Efficiency

Figure 2:
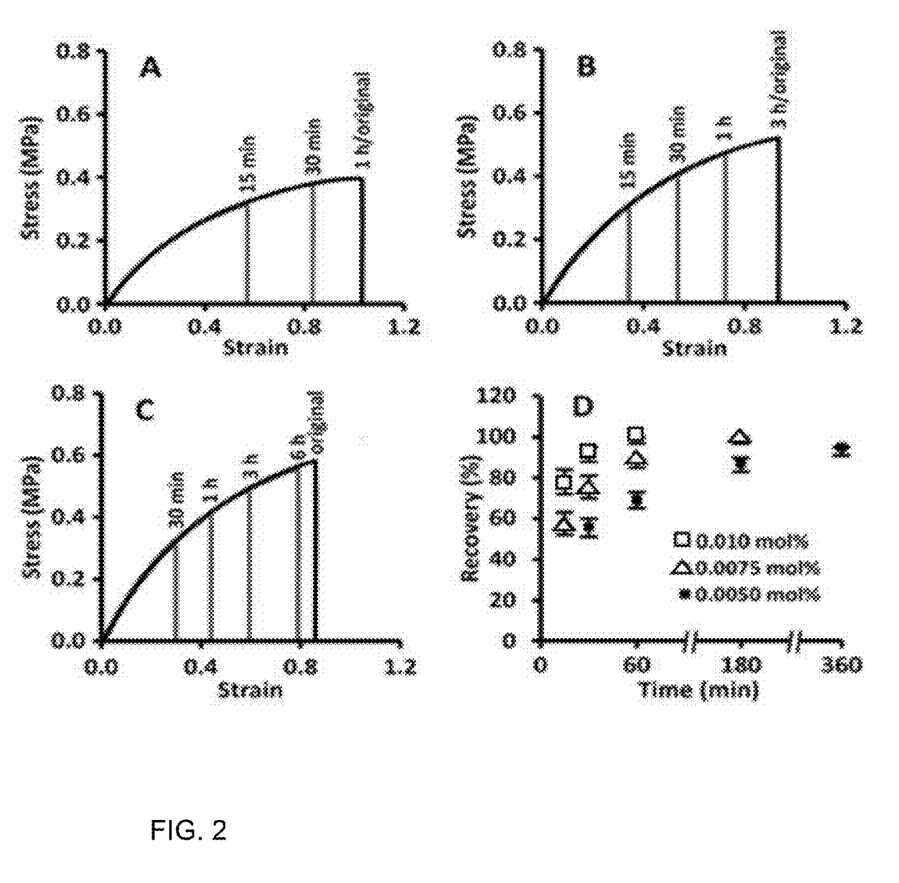
FIG. 2 is a panel of graphs of self-healing data of cross-linked PBD with Ru catalyst loading of 0.010 mol % (A), 0.0075 mol % (B), and 0.0050 mol % (C), healed at 20 kPa pressure and room temperature (22° C.). Tensile tests were conducted after different healing times. Various vertical lines indicate elongation at break for the given healing times. The last vertical line in black always represents the strain at break for the original sample. For samples with complete healing, the final healing curves superimpose with the stress-strain curves of the original samples, which are labeled as "# h (final healing time)/original". (D) Percentage recovery of tensile stress with time for PBD network with different catalyst loading at the healing conditions specified above.
Figure 6:
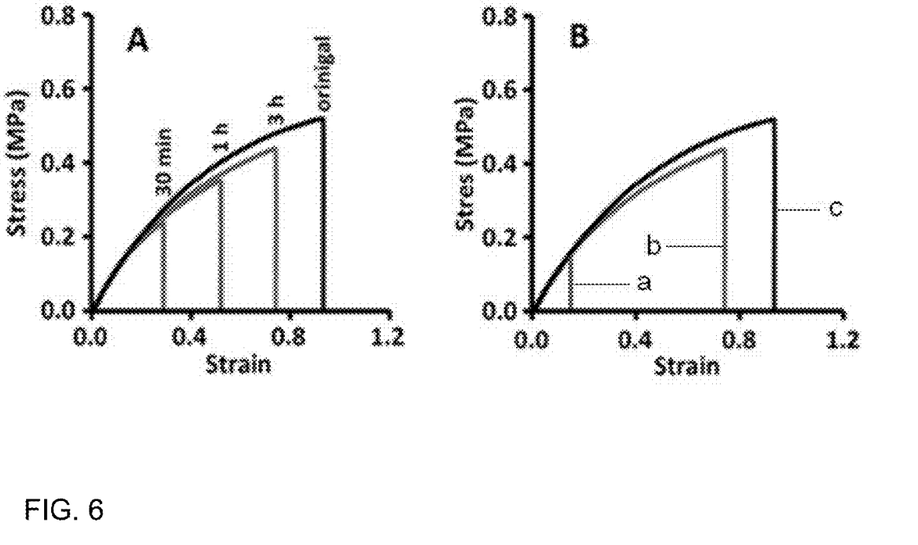
FIG. 6 is a panel of graphs of (A) Healing test of 0.0075 mol % Ru-loaded PBD sample and Ru-free control PBD at normal healing condition (compression pressure 20 kPa, 22° C.). (B) Comparison of self-healing profiles of Ru-free control ("a"), Ru-loaded (0.0075 mol %)/Ru-free control ("b"), and Ru-loaded/Ru-loaded ("c") samples after 3 hours of healing time.

Firstly, the self-healing efficiency of PBD network loaded with different amounts of the Ru catalyst (FIG. 2) was investigated. All cut samples were healed in mold at room temperature under 20 kPa of compression. At 0.010 and 0.0075 mol % Ru catalyst loading, the cut samples self-healed completely and recovered their original mechanical properties after 1 hour and 3 hours healing, respectively (FIGS. 2A&B). The quantitative healing was also evidenced by the observation that, during the tensile tests, the healed samples finally broke statistically at different positions instead of just at the healing interface. At the lowest catalyst loading (0.0050 mol %), the sample healed at a slower rate, but still recovered 95% of the ultimate tensile strength after 6 hours of healing (FIG. 2C). As expected, higher catalyst loading accelerates the self-healing process because more Ru catalyst should speed up olefin metathesis reaction at the healing interface. For all three samples, self-healing occurred faster in the beginning and then gradually leveled off (FIG. 2D). Presumably, initial olefin metathesis reaction at the healing interface would contribute more effectively to new bonds formation between the two cut surfaces. With an increasing number of bonds forming between the healing surfaces, olefin metathesis reactions in later stage would contribute less to new bonds formation between the interfaces. As will be discussed later (FIG. 6B), the catalyst-free control PBD network only shows minimal healing capability (vide infra).

Effects of Pressure on Healing Efficiency

Figure 3:
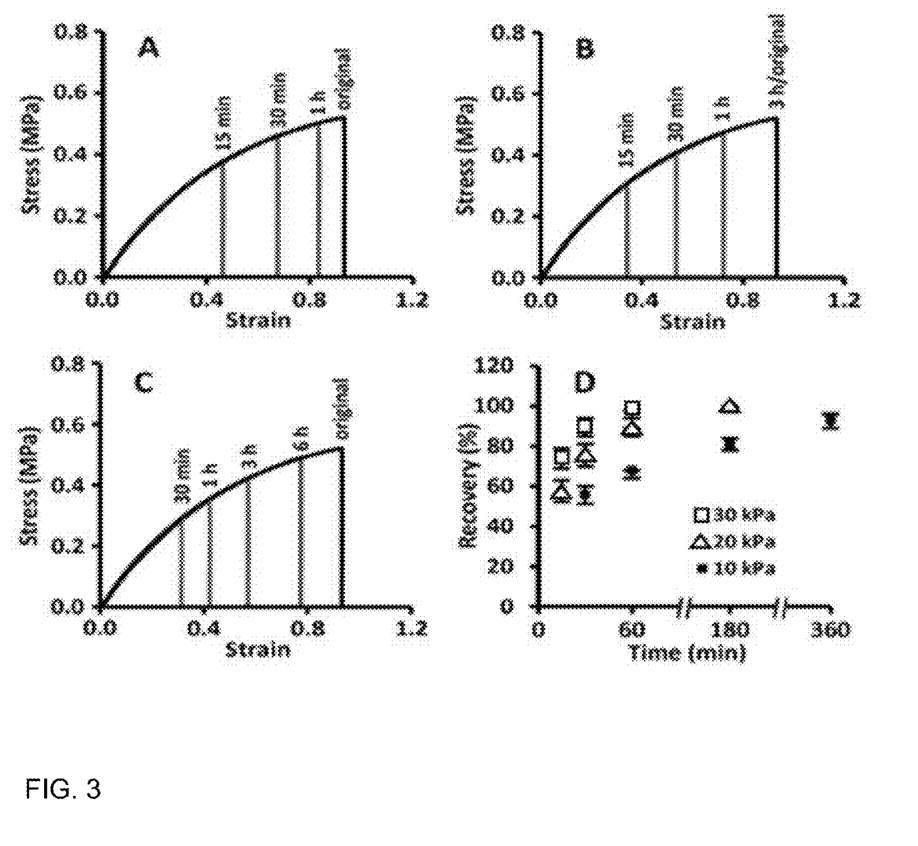
FIG. 3 is a panel of graphs of self-healing data of cross-linked PBD with 0.0075 mol % Ru catalyst loading at different compression pressure: (A): 30 kPa, (B): 20 kPa, (C): 10 kPa, at room temperature (22° C.). All labels and format follow the same as FIG. 1. (D) Percentage recovery of tensile stress with time for the same samples at different compression pressure at room temperature.

Next, the effect of compression pressure on self-healing efficiency of the materials was investigated. Thus, 10 kPa, 20 kPa and 30 kPa of compression pressure was applied, respectively, to two freshly cut specimens with 0.0075 mol % of Ru catalyst loading and let the sample heal at room temperature. As shown in FIG. 3, a moderate pressure is necessary for the healing and the sample heals more efficiently at higher compression pressure. For example, the strain at break recovered to respective 45%, 78%, and 90% of the original sample after 1 hour of healing under compression pressure of 10, 20, and 30 kPa, respectively (FIG. 3). A couple of factors should be noted here. First, as a covalent 3D network, the cross-linked PBD chains have limited long-range translational mobility at the fracture interface to facilitate the healing process. Second, as a very non-polar polymer for PBD, there are no strong molecular interactions to spontaneously attract the two cut surfaces together. Third, the healing experiments were conducted at room temperature or under cooling conditions, without inputting any external energy in heat or light. Given the microscopic roughness of the cut surfaces and the three factors discussed above, a moderate pressure is necessary to bring the two cut surfaces into molecular contact so that olefin cross metathesis between the two surfaces can occur. Higher compression pressure (FIG. 3A) would bring the polymer chains from the two cut surfaces closer to each other, hence more efficient metathesis between the two surfaces and faster healing.

Effects of Temperature on Healing Efficiency

Figure 4:
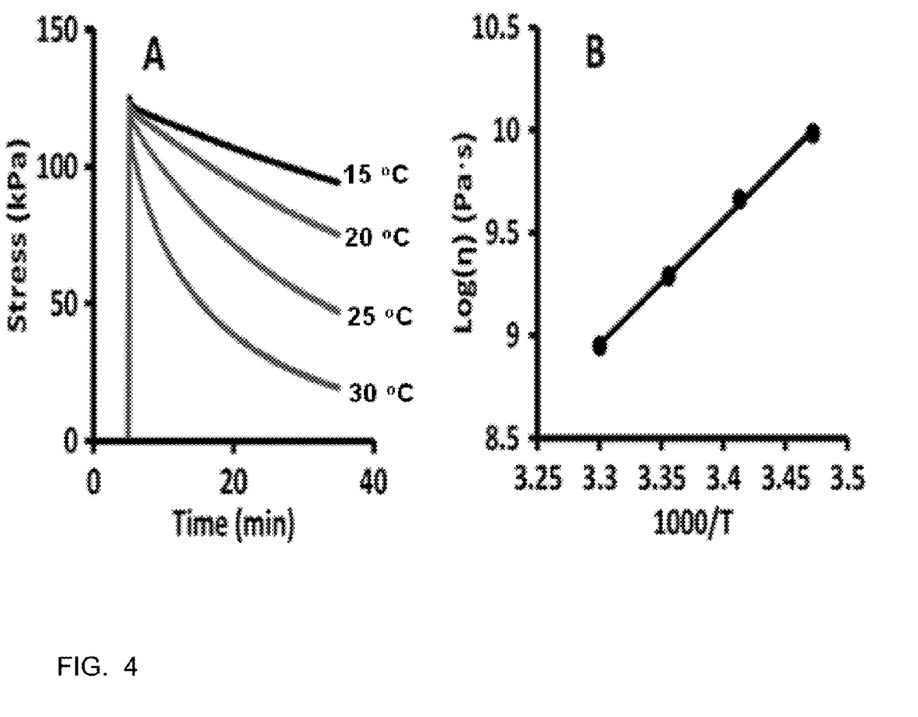
FIG. 4 is a panel of graphs of (A) Stress relaxation profiles of the PBD network loaded with 0.0075 mol % Ru catalyst at different temperatures (15° C.; 20°; 25° C.; 30° C.). 10% of strain was applied at t=5 min and the relaxation was conducted for 30 mins. (B) The temperature dependence of zero-shear viscosity.

To find out if such self-healing materials would be generally applicable at ambient conditions, the temperature dependence of their self-healing behavior was investigated. First, the temperature dependence of the Ru catalyst activity was studied via bulk stress relaxation experiments (35) which shows that the relaxation time of the materials decreases with increasing temperature (FIG. 4A). Quantitative correlation of viscosity-temperature data follows a simple Arrhenius law (36) with activation energy of 25.8 kcal/mol, a value agreeing well with literature reported value (23.0±0.4 kcal/mol) for olefin metathesis reaction using the same catalyst (37) Based on this activation energy value, the olefin metathesis reaction is estimated to accelerate by ~5 times for every increase of 10° C.

Figure 5:
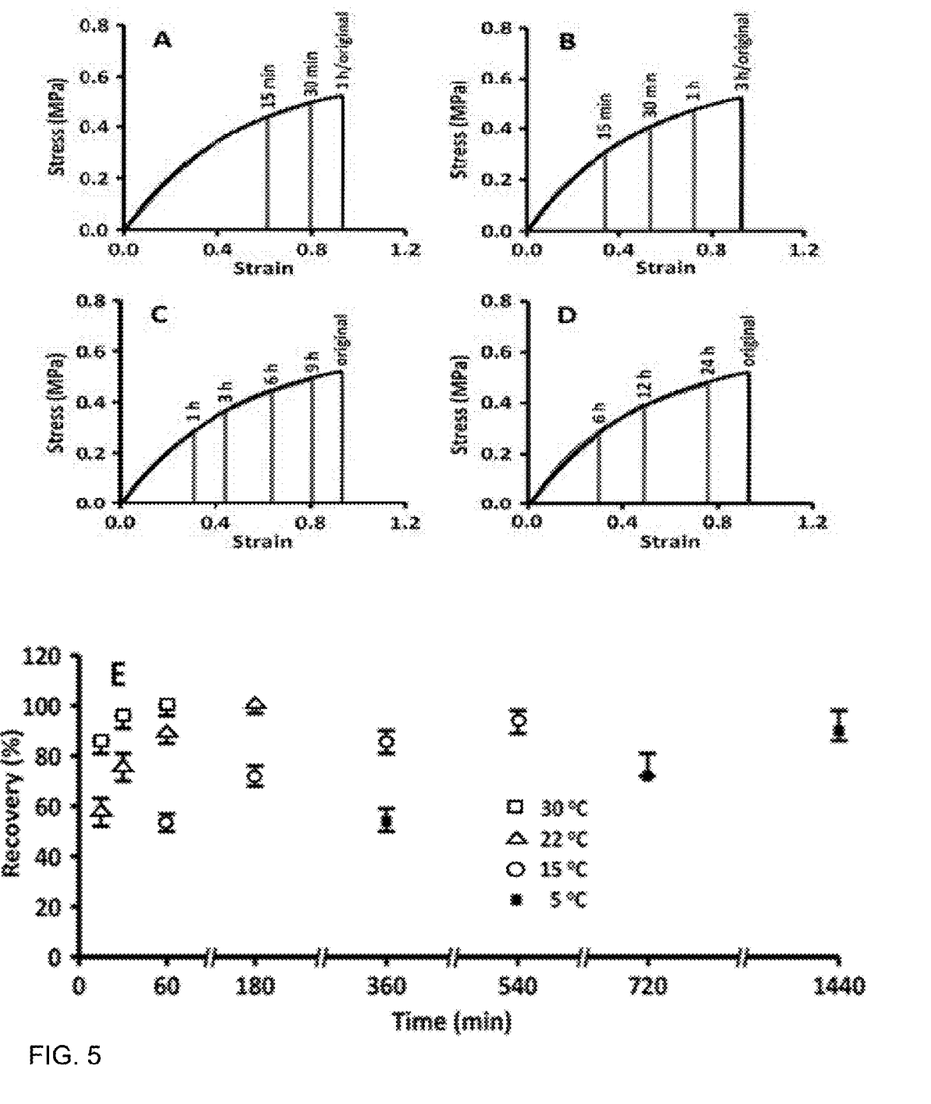
FIG. 5 is a panel of graphs of self-healing data of PBD network with 0.0075 mol % Ru catalyst loading. Two freshly cut surfaces were pressed together at 20 kPa and let heal at 30° C. (A), 22° C. (room temperature) (B), 15° C. (C) and 5° C. (D). Tensile tests were conducted after different healing times. All labels and format follow the same as FIG. 1. (E) Percentage recovery of tensile stress with time for the same samples healed at different temperatures.

Self-healing tests on a PBD sample were carried out at four different temperatures: 5, 15, 22 (room temperature) and 30° C. At constant catalyst loading (0.0075 mol %) and compression pressure (20 kPa), the sample healed faster at higher temperature (FIG. 5). For example, while it takes three hours to fully heal the sample at room temperature (FIG. 5B), a slight heat (30° C.) enabled the sample to completely heal after only one hour (FIG. 5A). This can be attributed to the accelerated olefin metathesis reaction at higher temperature as discussed previously (FIG. 4). Capitalizing the high healing efficiency of this system, we further tested healing at cooling condition. While cooling decreases the catalyst activity and slows down the healing process, the sample could still recover ~94% and ~90% of tensile strength at 15° C. after 9 hours (FIG. 4C) and 5° C. after 24 hours, respectively (FIG. 5D). To the inventor's knowledge, this is the first example of a dynamic covalent polymer that can self-heal efficiently at sub-ambient temperature. The quantitative comparison of temperature-dependence for self-healing efficiency for this sample is shown in FIG. 5E.

High Effectiveness of Self-Healing Via Olefin Metathesis.

The effectiveness and high healing efficiency of this system was further demonstrated by the following experiment in which a Ru-loaded sample healed with a corresponding control PBD sample with the Ru catalyst removed by treating with vinyl ether. (37,38). It was reasoned that with one surface containing the Ru catalyst, olefin metathesis reaction could still occur at the interface, forming new C—C bonds to connect with the other surface containing no Ru catalyst. Indeed, at room temperature and 20 kPa pressure, the Ru-loaded sample healed with the Ru-free samples with time (FIG. 6A). After three hours of healing, the sample recovered ~80% of the maximal strain. This offers a promising new strategy for healing mechanical damages: filling the crack of a normal catalyst-free PBD network with PBD containing a small amount of the Ru catalyst, olefin metathesis between the catalyst-free surface of the fractured sample and the newly added Ru-loaded PBD would result in covalent healing of the crack. In sharp contrast, two pieces of freshly cut Ru-free control sample showed only minimal healing capability (FIG. 6B, ~15% recovery of the maximal strain). Presumably, the minimal healing of the control sample could be due to diffusion of some long dangling polymer chains across the interface. (39) It should be noted that the cross-linked PBD networks used in this study contain minimal soluble polymers. The fraction of soluble polymers for Ru-loaded PBD networks by repetitive extraction with a good solvent, n-heptane was quantitatively investigated. For example, for the most commonly used PBD samples in this study (Ru loading of 0.0075 mol %), 2.7%, 1.0% and 0.8% weight loss, respectively, was observed after three cycles of 1-hour extractions. Based on this data, it was concluded that the contribution of diffusion of soluble polymers to healing should be insignificant, which agrees with the minimal healing observed for the control sample (FIG. 6B).

Figure 7:
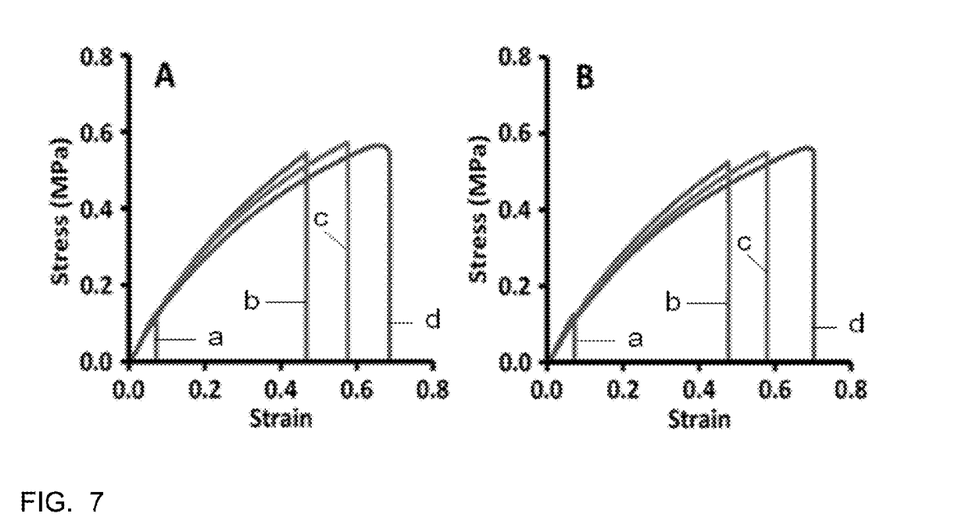
FIG. 7 is a panel of graphs of (A) Healing result of pristine PBD samples with 0 ("a"), 1.25 ("b"), 2.5 ("c"), and 5.0 µg ("d") of Ru catalyst respectively applied onto both fracture surfaces (10 mm×2 mm). (B) Healing result of pristine PBD samples with 0 ("a"), 2.5 ("b"), 5.0 ("c"), 10.0 µg ("d") of Ru catalyst respectively applied onto only one single fracture surface (10 mm×2 mm). The two cut pieces were pressed together at 20 kPa and let heal at room temperature for three hours.
Figure 8:
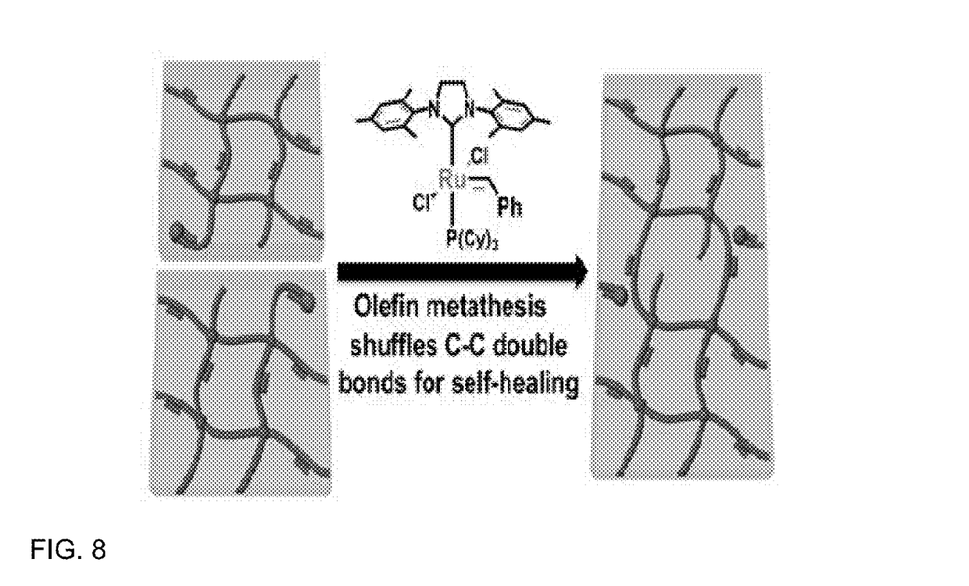
FIG. 8 is a schematic drawing of olefin metathesis which shuffles C—C double bonds for seal-healing.

Lastly, the high effectiveness of olefin metathesis for self-healing is demonstrated by another experiment. Instead of loading the Ru catalyst to the bulk sample, a small amount of Ru catalyst was applied only to the fracture surfaces of a pristine PBD network containing no Ru catalyst. Since healing occurs at the fracture interfaces, it was reasoned that only a small amount of Ru catalyst at the fracture interface is necessary to catalyze the C═C bond metathesis between the two surfaces for healing. In one set of tests, 1.25, 2.5, and 5.0 μg of Ru catalyst, respectively, was evenly applied onto both fracture surfaces (10 mm×2 mm), which were subsequently pressed together at 20 kPa for healing (FIG. 7A). In another set of experiments, the same total amounts of Ru catalyst were applied to only one fracture surface, which was then pressed to a pristine PBD cut surface without any catalyst (FIG. 7B). Visually, the colored Ru catalyst resides only at the fracture interface. In both cases, the samples healed very effectively (FIGS. 7A&B). In sharp contrast, the identical samples without applying any Ru catalyst at fracture interfaces showed very minimal healing (red curves in FIGS. 7A&B).

Besides further demonstration of the effectiveness of the healing method via olefin metathesis, this last result is significant for a few reasons. Firstly, by applying Ru catalyst only to fracture surfaces, self-healing can be achieved without introducing malleability into the bulk sample. As demonstrated previously, loading Ru catalyst into a bulk PBD network makes it malleable. (35) While malleability is beneficial for some applications, shape persistence is desirable for some other applications. By applying a very small amount of Ru catalyst only onto the fracture interfaces, this provides an option to achieve effective self-healing while maintaining shape persistence. Indeed, no appreciable shape change for samples was observed during these healing tests. Secondly, this new approach not only reduces the catalyst quantity, but, more importantly, offers a practical method to heal pristine PBD networks without requiring any pre-treatment for the bulk samples.

CONCLUSION

In summary, this is a first reported example of olefin metathesis-mediated self-healing polymer based on dynamic exchange of strong covalent C—C double bonds. Due to the high healing effectiveness and efficiency, for the first time a bulk polymer could effectively heal via dynamic covalent bond formation at sub-ambient temperature. By introducing a very low level of the Grubbs' second-generation Ru metathesis catalyst and applying a moderate pressure, a commodity PBD network self-heals effectively in air under various temperatures. The effect of concentration of catalyst, compression pressure and temperature on the self-healing efficiency of the material was investigated. It was also observed that the materials not only heal with themselves but also with control samples without any Ru catalyst. Furthermore, Ru-free PBD samples can be healed effectively by applying a very small amount of Ru catalyst only to the fracture surfaces, which allows self-healing to be achieved without compromising shape persistence. The approach is simple, effective, and potentially applicable to a wide range of olefin-containing polymers such as polyisoprene, butyl rubber, polynorbornene, and other polymers containing double bonds amenable for metathesis. Given the strength of C—C double bonds, this method may offer the possibility of designing strong self-healing polymers.

Example 2

Experimental Methods for Example 1

General. All the chemicals were obtained from commercial vendors and used as received without further purification. Polybutadiene (PBD) was purchased from Aldrich with an average Mw of 200-300 kDa, with 99% of cis-1,4 addition. Grubbs' second-generation catalyst was obtained from the Materia Inc. as free samples.

Sample Preparation

The Ru-loaded samples and Ru-free control samples were prepared following the same method as reported previously, (35) which is briefly described as follows. First, PBD was dissolved in dichloromethane (DCM) and then 1% mole (relative to the molarity of double bonds in PBD) of benzyl peroxide was added to the polymer solution. The solvent was then evaporated at room temperature and the residue was molded in Teflon mold and heated at 100° C. under vacuum for 6 h. The specimens (20 mm×10 mm×2 mm) were then swelled in DCM and washed thoroughly to remove unreacted BPO and any byproducts. Under cooling condition using an acetonenitrile/dry ice bath (−42° C.), the samples were then swelled in DCM solutions containing the Grubbs' second-generation Ru metathesis catalyst for 1 hour to incorporate different amount of the Ru catalyst: 0.010, 0.0075, 0.0050 mol % (relative to the molarity of olefin), respectively. The specimens were then dried under vacuum at room temperature for 2 hours and finally subjected to self-healing tests. For control samples, the same Ru-loaded specimens were quenched in vinyl ether at room temperature for 2 hours and then washed thoroughly with DCM to remove cleaved catalyst. (37, 38) The specimens were then dried under vacuum at room temperature for 2 hours and subjected to self-healing tests.

Mechanical Tests

The tensile mechanical properties of the polymers were measured using an Instron 3365 machine in standard stress/strain experiments. The specimens were extended at 100 mm/min at room temperature. Stress-relaxation experiments (FIG. 4) were performed using a TA Instru-ments DMA Q800 with attached cryo accessory. A constant strain of 10% was applied at t=5 min and then was maintained for 30 mins at 15, 20, 25 and 30° C.

Self-Healing Tests

A) For self-healing tests of Ru-loaded samples: a sample loaded with a certain concentration of the Ru catalyst (0.010, 0.0075 or 0.0050 mol %) was first cut with a razor blade and the cut faces were pressed together right after being cut. Then the samples were let to self-heal in a Teflon mold under a certain compression pressure (10, 20 or 30 kPa) and at a certain temperature (5, 15, 22 (room temperature), or 30° C.) in air. After various healing times, the samples were subjected to stress-strain tests at room temperature at 100 mm/min pulling rate.

B) For self-healing tests of a Ru-loaded sample with its corresponding Ru-free control sample: a Ru loaded sample (0.0075 mol % Ru loading) and a Ru-free control sample were first cut with a razor blade. One piece of the Ru-loaded sample and the other piece from its corresponding Ru-free control sample were pressed together right after being cut. Then they were let to self-heal in a Teflon mold at 20 kPa of compression pressure at room temperature (22° C.) in air. The samples were then subjected to stress-strain tests at room temperature at 100 mm/min pulling rate.

C) For self-healing tests of the control samples: the Ru-quenched controls (before quenching, the sample was loaded with 0.0075 mol % of the Ru catalyst) was first cut with a razor blade and the cut faces were pressed together right after being cut. Then they were let to self-heal in a Teflon mold at 20 kPa of compression pressure at room temperature (22° C.) in air. The samples were then subjected to stress-strain tests at room temperature at 100 mm/min pulling rate.

D) For self-healing tests of pristine PBD samples with Ru catalyst applied only at the cut surfaces: a pristine PBD sample was first cut with a razor blade. Using a 25 μL micro syringe, a DCM solution of Ru catalyst (0.5 mg/mL) was applied onto both cut faces (2.5, 5.0 or 10 μL each face) or only one cut face (5.0, 10 or 20 μL) and then the cut pieces were let dry under vacuum for 5 min. The cut faces were then pressed together and were let to self-heal in a Teflon mold at 20 kPa of compression pressure at room temperature (22° C.) in air for 3 hours. The samples were then subjected to stress-strain tests at room temperature at 100 mm/min pulling rate.

E) For self-healing tests of pristine PBD samples without any Ru catalyst: a pristine PBD sample was first cut with a razor blade. The cut faces were then pressed together right after being cut and were let to self-heal in a Teflon mold at 20 kPa of compression pressure at room temperature (22° C.) in air for 3 hours. The samples were then subjected to stress-strain tests at room temperature at 100 mm/min pulling rate.

Quantitation of Soluble Polymers in PBD Networks

The Ru-loaded samples (with 0.010, 0.0075 or 0.0050 mol % Ru) were swollen in n-heptane for 1 hour and then dried under vacuum for 12 hours. The weight loss was calculated from the weights of the initial samples and of the samples after swelling and drying. The same process was repeated three times for each sample. The percentage weight losses for all samples in three cycles of extraction are as follows: 4.8%, 1.5% and 1.7% weight loss for the 0.010 mol % Ru-loaded sample, 2.7%, 1.0% and 0.8% weight loss for the 0.0075 mol % Ru-loaded sample, and 1.1%, 0.3% and 0.4% weight loss for the 0.0050 mol % Ru-loaded sample.

REFERENCES

The following publications are incorporated by reference herein:

(1) White, S. R.; Sottos, N. R.; Geubelle, P. H.; Moore, J. S.; Kessler, M. R.; Sriram, S. R.; Brown, E. N.; Viswanathan, S. Nature 2001, 409, 794-797.
(2) Toohey, K. S.; Sottos, N. R.; Lewis, J. A.; Moore, J. S.; White, S. R. Nat. Mater. 2007, 6, 581-585.
(3) Cordier, P.; Tournilhac, F.; Soulie-Ziakovic, C.; Leibler, L. Nature 2008, 451, 977-980.
(4) Montarnal, D.; Tournilhac, F.; Hidalgo, M.; Couturier, J.-L.; Leibler, L. J. Am. Chem. Soc. 2009, 131, 7966-7967.
(5) Burattini, S.; Greenland, B. W.; Merino, D. H.; Weng, W.; Seppala, J.; Colquhoun, H. M.; Hayes, W.; Mackay, M. E.; Hamley, I. W.; Rowan, S. J. J. Am. Chem. Soc. 2010, 132, 12051-12058.
(6) Burattini, S.; Colquhoun, H. M.; Fox, J. D.; Friedmann, D.; Greenland, B. W.; Harris, P. J. F.; Hayes, W.; Mackay, M. E.; Rowan, S. J. Chem. Commun. 2009, 6717-6719.
(7) Holten-Andersen, N.; Harrington, M. J.; Birkedal, H.; Lee, B. P.; Messer-smith, P. B.; Lee, K. Y. C.; Waite, J. H. Proc. Natl. Acad. Sci. U.S.A. 2011, 108, 2651-2655.
(8) Phadke, A.; Zhang, C.; Arman, B.; Hsu, C.-C.; Mashelkar, R. A.; Lele, A. K.; Tauber, M. J.; Arya, G.; Varghese, S. Proc. Natl. Acad. Sci. U.S.A. 2012, 109, 4383-4388.
(9) Burnworth, M.; Tang, L.; Kumpfer, J. R.; Duncan, A. J.; Beyer, F. L.; Fiore, G. L.; Rowan, S. J.; Weder, C. Nature 2011, 472, 334-337.
(10) Chen, Y.; Kushner, A. M.; Williams, G. A.; Guan, Z. Nat. Chem. 2012, 4, 467-472.
(11) Wang, Q.; Mynar, J. L.; Yoshida, M.; Lee, E.; Lee, M.; Okuro, K.; Kinbara, K.; Aida, T. Nature 2010, 463, 339-343.
(12) Harada, A.; Kobayashi, R.; Takashima, Y.; Hashidzume, A.; Yamaguchi, H. Nat. Chem. 2011, 3, 34-37.
(13) Chen, X.; Dam, M. A.; Ono, K.; Mal, A.; Shen, H.; Nutt, S. R.; Sheran, K.; Wudl, F. Science 2002, 295, 1698-1702.
(14) Murphy, E. B.; Bolanos, E.; Schaffner-Hamann, C.; Wudl, F.; Nutt, S. R.; Auad, M. L. Macromolecules 2008, 41, 5203-5209.
(15) Reutenauer, P.; Buhler, E.; Boul, P. J.; Candau, S. J.; Lehn, J. M. Chem-Eur. J. 2009, 15, 1893-1900.

(16) Chung, C.-M.; Roh, Y.-S.; Cho, S.-Y.; Kim, J.-G. Chem. Mater. 2004, 16, 3982-3984.
(17) Froimowicz, P.; Frey, H.; Landfester, K. Macromol. Rapid Commun. 2011, 32, 468-473.
(18) Capelot, M.; Montarnal, D.; Tournilhac, F.; Leibler, L. J. Am. Chem. Soc. 2012, 134, 7664-7667.
(19) Amamoto, Y.; Kamada, J.; Otsuka, H.; Takahara, A.; Matyjaszewski, K. Angew. Chem., Int. Ed. 2011, 50, 1660-1663.
(20) Imato, K.; Nishihara, M.; Kanehara, T.; Amamoto, Y.; Takahara, A.; Otsuka, H. Angew. Chem., Int. Ed. 2012, 51, 1138-1142.
(21) Yao, L.; Yuan, Y. C.; Rong, M. Z.; Zhang, M. Q. Polymer 2011, 52, 3137-3145.
(22) Yoon, J. A.; Kamada, J.; Koynov, K.; Mohin, J.; Nicolaÿ, R.; Zhang, Y.; Balazs, A. C.; Kowalewski, T.; Matyjaszewski, K. Macromolecules 2011, 45, 142-149.
(23) Deng, G.; Tang, C.; Li, F.; Jiang, H.; Chen, Y. Macromolecules 2010, 43, 1191-1194.
(24) Skene, W. G.; Lehn, J.-M. P. Proc. Natl. Acad. Sci. U.S.A. 2004, 101, 8270-8275.
(25) Zheng, P.; McCarthy, T. J. J. Am. Chem. Soc. 2012, 134, 2024-2027.
(26) Ghosh, B.; Urban, M. W. Science 2009, 323, 1458-1460.
(27) Wang, H. P.; Yuan, Y. C.; Rong, M. Z.; Zhang, M. Q. Macromolecules 2009, 43, 595-598.
(28) Rowan, S. J.; Cantrill, S. J.; Cousins, G. R. L.; Sanders, J. K. M.; Stoddart, J. F. Angew. Chem., Int. Ed. 2002, 41, 898-952.
(29) Maeda, T.; Otsuka, H.; Takahara, A. Prog. Polym. Sci. 2009, 34, 581-604.
(30) Ling, J.; Rong, M. Z.; Zhang, M. Q. Polymer 2012, 53, 2691-2698.
(31) Montarnal, D.; Capelot, M.; Tournilhac, F.; Leibler, L. Science 2011, 334, 965-968.
(32) Scott, T. F.; Schneider, A. D.; Cook, W. D.; Bowman, C. N. Science 2005, 308, 1615-1617.
(33) Schrock, R. R. J. Mol. Catal A: Chem 2004, 213, 21-30.
(34) Vougioukalakis, G. C.; Grubbs, R. H. Chem. Rev. 2009, 110, 1746-1787.
(35) Lu, Y.-X.; Tournilhac, F.; Leibler, L.; Guan, Z. J. Am. Chem. Soc. 2012, 134, 8424-8427.
(36) Ferry, J. Viscoelastic Properties of Polymers; Wiley: New York, 1980.
(37) Sanford, M. S.; Love, J. A.; Grubbs, R. H. J. Am. Chem. Soc. 2001, 123, 6543-6554.
(38) Maynard, H. D.; Okada, S. Y.; Grubbs, R. H. Macromolecules 2000, 33, 6239-6248.
(39) Kim, Y. H.; Wool, R. P. Macromolecules 1983, 16, 1115-1120.

What is claimed is:

1. A method of preparing a malleable and/or self-healing polymeric or polymer composite material, comprising:
    providing at least one alkene-containing polymer,
    combining the polymer with at least one homogenous or heterogeneous transition metal olefin metathesis catalyst to form a polymeric or polymer composite material, and
    performing an olefin metathesis reaction on the polymer that results in reversible carbon-carbon double bond exchange between polymer chains of the polymer without polymerization.

2. The method of claim 1, wherein the polymer is polybutadiene, polyisoprene, butyl rubber, polynorbornene, polycyclooctene, polycyclooctadiene, unsaturated polyester, polystyrene-b-polybutadiene, polystyrene-b-polybutadiene-b-polystyrene, a random/block/graft copolymer containing alkene functionality on either polymer backbone or side chain, a functionalization thereof, a partial hydrogenation thereof, or a combination thereof.

3. The method of claim 1, wherein the catalyst is a ruthenium-based olefin metathesis catalyst, a molybdenum-based olefin metathesis catalyst, a tungsten-based olefin metathesis catalyst, a heterogeneous olefin metathesis catalyst, or a combination thereof.

4. The method of claim 3, wherein the ruthenium-based olefin metathesis catalyst is a first or second generation of Grubbs' catalysts, a first or second generation Hoveyda-Grubbs catalyst, or a combination thereof.

5. The method of claim 1, wherein the composite material is formed by either physical blending or chemical bonding of organic, inorganic, semiconducting or metallic particles with the at least one alkene-containing polymer as a matrix material.

6. A malleable and/or self-healing polymeric or polymer composite material prepared by the method of claim 1.

7. A method of healing a fractured surface of a polymeric material, comprising
    bringing a fractured surface of a first polymeric material into contact with a second polymeric material, and
    performing an olefin metathesis reaction in the presence of at least one homogeneous or heterogeneous transition metal olefin metathesis catalyst such that an olefin-containing polymer of the first polymeric material undergoes reversible carbon-carbon double bond exchange with an olefin-containing polymer of the second polymeric material without polymerization.

8. The method of claim 7, wherein the catalyst is a ruthenium-based olefin metathesis catalyst, a molybdenum-based olefin metathesis catalyst, a tungsten-based olefin metathesis catalyst, a heterogeneous olefin metathesis catalyst, or a combination thereof.

9. The method of claim 7, wherein the olefin metathesis reaction is performed at ambient or sub-ambient temperature.

10. The method of claim 7, wherein the first polymeric material and the second polymeric material are the same or different, or the polymer of the first polymeric material and the polymer of the second polymeric material are the same or different.

11. The method of claim 7, wherein the polymer of the first polymeric material and the polymer of the second polymeric material are each independently polybutadiene, polyisoprene, butyl rubber, polynorbornene, polycyclooctene, polycyclooctadiene, unsaturated polyester, polystyrene-b-polybutadiene, polystyrene-b-polybutadiene-b-polystyrene, a random/block/graft copolymer containing alkene functionality on either polymer backbone or side chain, a functionalization thereof, a partial hydrogenation thereof, or a combination thereof.

12. The method of claim 7, wherein at least one of the polymer materials is a polymer composite material.

13. A self-healing polymer composition comprising an olefin-containing polymer and at least one homogeneous or heterogeneous transition metal olefin metathesis catalyst, the polymer comprising reversible carbon-carbon double bonds formed by action of the catalyst, wherein the polymer composition undergoes, by action of the catalyst, reversible carbon-carbon double bond exchange between two fractured surfaces of the polymer composition without polymerization when the fractured surfaces are bought into contact with each other.

14. The polymer composition of claim 13, wherein the catalyst is a ruthenium-based olefin metathesis catalyst, a molybdenum-based olefin metathesis catalyst, a tungsten-based olefin metathesis catalyst, a heterogeneous olefin metathesis catalyst, or a combination thereof.

15. The polymer composition of claim 13, wherein the polymer is polybutadiene, polyisoprene, butyl rubber, polynorbornene, polycyclooctene, polycyclooctadiene, unsaturated polyester, polystyrene-b-polybutadiene, polystyrene-b-polybutadiene-b-polystyrene, a random/block/graft copolymer containing alkene functionality on either polymer backbone or side chain, a functionalization thereof, a partial hydrogenation thereof, or a combination thereof.

16. The polymer composition of claim 13, wherein the polymer composition is a polymer composite material.

17. A method of forming a self-healing polymer, comprising
performing an olefin metathesis reaction on an olefin-containing polymer by forming a polymer composition comprising the polymer and at least one homogenous or heterogeneous transition metal olefin metathesis catalyst, the reaction resulting in reversible carbon-carbon double bond exchange between polymer chains of the polymer, wherein the polymer composition undergoes, at ambient or sub-ambient temperature by action of the catalyst, reversible carbon-carbon double bond exchange between two fractured surfaces of the polymer composition without polymerization when the fractured surfaces are bought into contact with each other.

18. The method of claim 17, wherein the catalyst is a ruthenium-based olefin metathesis catalyst, a molybdenum-based olefin metathesis catalyst, a tungsten-based olefin metathesis catalyst, a heterogeneous olefin metathesis catalyst, or a combination thereof.

19. The method of claim 17, wherein the polymer is polybutadiene, polyisoprene, butyl rubber, polynorbornene, polycyclooctene, polycyclooctadiene, unsaturated polyester, polystyrene-b-polybutadiene, polystyrene-b-polybutadiene-b-polystyrene, a random/block/graft copolymer containing alkene functionality on either polymer backbone or side chain, a functionalization thereof, a partial hydrogenation thereof, or a combination thereof.

20. The method of claim 17, wherein polymer composition is a polymer composite material.

* * * * *